US008464860B2

(12) United States Patent
Frey et al.

(10) Patent No.: US 8,464,860 B2
(45) Date of Patent: Jun. 18, 2013

(54) SYSTEM FOR THERMALLY CONTROLLING A SOLID FEED PUMP

(75) Inventors: George Frederick Frey, Houston, TX (US); Steven Craig Russell, Houston, TX (US)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 12/887,335

(22) Filed: Sep. 21, 2010

(65) Prior Publication Data
US 2012/0067702 A1 Mar. 22, 2012

(51) Int. Cl.
*F23K 3/00* (2006.01)

(52) U.S. Cl.
USPC .................. 198/642; 406/71; 406/99

(58) Field of Classification Search
USPC .. 198/642; 406/71, 99–104; 415/90; 110/101 R, 106, 115
See application file for complete search history.

(56) References Cited

U.S. PATENT DOCUMENTS

| 4,197,092 A * | 4/1980 | Bretz | 48/86 R |
|---|---|---|---|
| 4,516,674 A | 5/1985 | Firth | |
| 4,988,239 A | 1/1991 | Firth | |
| 5,051,041 A | 9/1991 | Firth | |
| 5,223,199 A | 6/1993 | Ponzielli | |
| 5,356,280 A | 10/1994 | Ponzielli | |
| 5,485,909 A | 1/1996 | Hay | |
| 5,497,873 A | 3/1996 | Hay | |
| 5,551,553 A | 9/1996 | Hay | |
| 6,213,289 B1 | 4/2001 | Hay et al. | |
| 6,237,816 B1 | 5/2001 | Boritzki | |
| 7,784,415 B2 * | 8/2010 | Engel | 110/229 |
| 8,307,975 B2 * | 11/2012 | Fang et al. | 198/640 |
| 2007/0144411 A1 * | 6/2007 | Matysik et al. | 110/115 |
| 2008/0145156 A1 | 6/2008 | Livingood et al. | |
| 2008/0302280 A1 * | 12/2008 | Case et al. | 110/106 |

FOREIGN PATENT DOCUMENTS

| DE | 4218094 A1 | 12/1992 |
|---|---|---|
| EP | 0607964 A1 | 7/1994 |
| EP | 1676795 A1 | 7/2006 |

OTHER PUBLICATIONS

European Search Report for EP Application No. 11180151.0, dated Jan. 9, 2012.
U.S. Appl. No. 12/763,101, filed Apr. 19, 2010, Akundy et al.
U.S. Appl. No. 12/763,040, filed Apr. 19, 2010, Fang et al.

* cited by examiner

*Primary Examiner* — Mark A Deuble
(74) *Attorney, Agent, or Firm* — Fletcher Yoder, P.C.

(57) ABSTRACT

According to various embodiments, a system includes a solid feed pump. The solid feed pump includes a housing, a rotor disposed in the housing, a curved passage disposed between the rotor and the housing, an inlet coupled to the curved passage, an outlet coupled to the curved passage, a solid feed guide extending across the curved passage, and a thermal control path through a portion of the solid feed pump.

20 Claims, 10 Drawing Sheets

SYSTEM FOR THERMALLY CONTROLLING A SOLID FEED PUMP

BACKGROUND OF THE INVENTION

The subject matter disclosed herein relates to a solid feed pump and, more specifically, to a thermal management system for the solid feed pump.

A typical pump designed for dry solids, such as particulate matter, has a single continuous channel. For example, the pump may be a rotary pump that drives the solids along a circular path from an inlet to an outlet, while increasing the pressure of the solids. Unfortunately, the flow of solids at higher pressures and speeds may cause high heat generation in the pump in the outlet, solid feed guide, housing, and along the rotor.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a solid feed pump. The solid feed pump includes a housing, a rotor disposed in the housing, a curved passage disposed between the rotor and the housing, an inlet coupled to the curved passage, an outlet coupled to the curved passage, a solid feed guide extending across the curved passage, and a thermal control path through a portion of the solid feed pump.

In accordance with a second embodiment, a system includes a solid fuel pump. The solid fuel pump includes a housing, a rotor disposed in the housing, and an inert fluid thermal control path through a portion of the solid feed pump.

In accordance with a third embodiment, a system includes a solid feed pump. The solid feed pump includes an internal feed passage, an inlet coupled to the internal feed passage, an outlet coupled to the internal feed passage, and an inert fluid path through the solid feed pump. The solid feed pump also includes a fluid recirculation system coupled to the inert fluid path, wherein the fluid recirculation system is configured to couple with a solid feed path upstream from the solid feed pump, a solid transport path downstream from the solid feed pump, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a system for thermal management (e.g., cooling) a solid feed pump and for integrating streams from the thermal management system to components of the dry solids handling process, both internal and external to the pump, or other plant components. Solid feed pumps convey dry solids, such as particulate matter, from an area of low pressure to an area of higher pressure, while increasing the pressure of the solids. However, increasing the pressure of the solids, as well as increasing the speed of conveyance of the solids from an inlet to an outlet of the pump generates heat. High heat generation may occur in the pump adjacent the outlet, at a solid feed guide adjacent the outlet, in a housing of the pump, and along a rotor of the pump.

Embodiments of the present disclosure provide a solid feed pump and a thermal management system to cool components of the solid feed pump. For example, the solid feed pump includes a thermal control (e.g., coolant) path through a portion of the solid feed pump. Also, the thermal control path may include a guide coolant path internal and/or external to the solid feed guide of the solid pump. In addition, the thermal control path may extend along the outlet and include one or more cooling coils. Further, the thermal control path may extend through the housing of the pump. Alternatively, the thermal control path may include a rotor coolant path. Other embodiments provide a solid fuel pump that includes an inert fluid thermal control (e.g., inert gas coolant path) through a portion of the solid feed pump. In certain embodiments, the pump may also include an inert fluid recirculation system (e.g., gas recirculation system) coupled to the inert fluid thermal control path to divert the streams from the thermal control path upstream and/or downstream of the solid feed pump. For example, the streams may be diverted to warm a baghouse or bin, or the streams may be diverted to buffer against undesirable process streams in the pump. In each of the disclosed embodiments, the thermal management system is designed to cool the solid feed pump and to extend the pump's hardware life as well as allow the use of less expensive metals in the pump.

Figure 1:
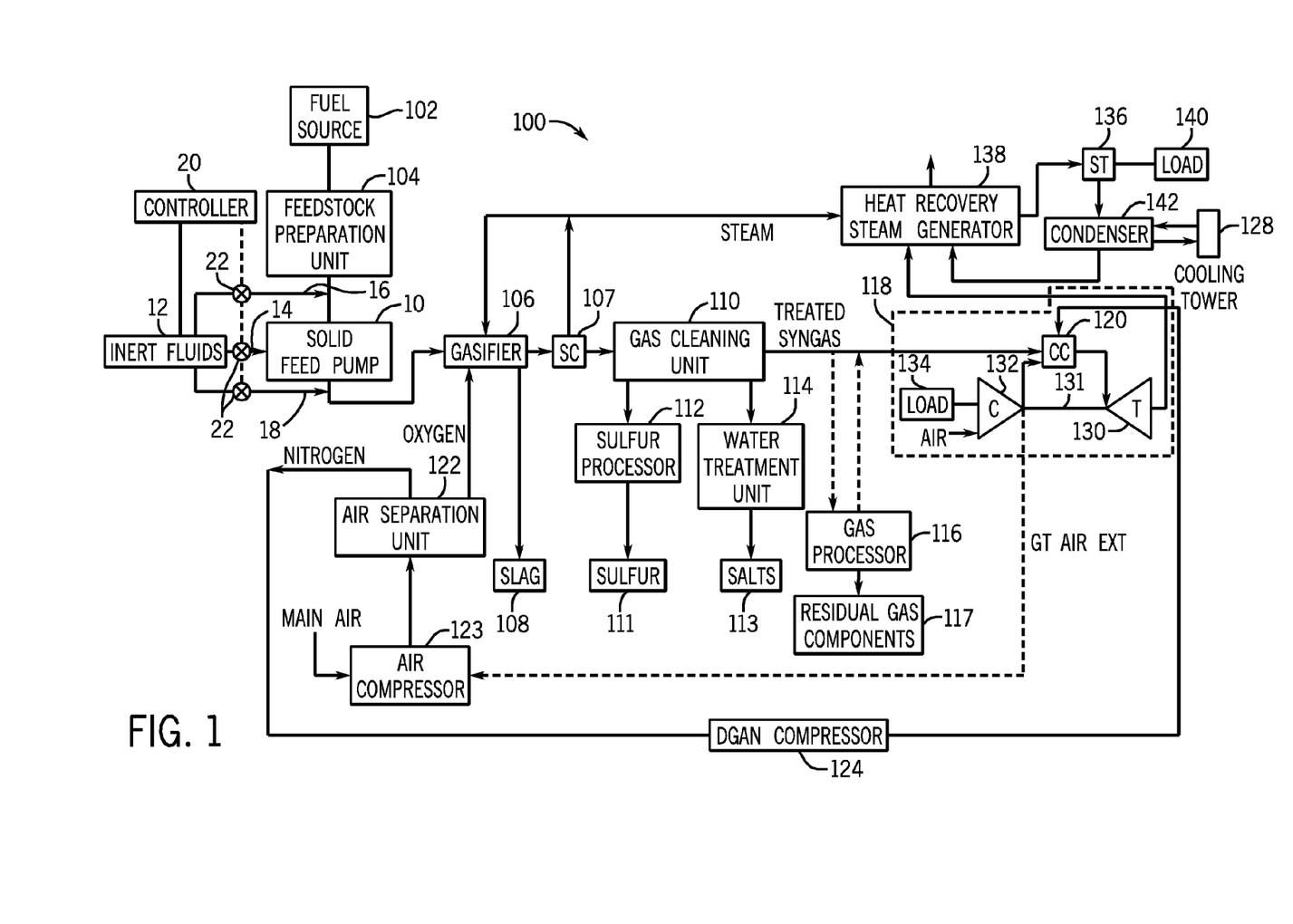
FIG. 1 is a schematic block diagram of an embodiment of an integrated gasification combined cycle (IGCC) power plant utilizing a solid feed pump with a thermal management system.

FIG. 1 is a diagram of an embodiment of an integrated gasification combined cycle (IGCC) system 100 utilizing one or more solid feed or solid fuel pumps 10 with a thermal management (e.g., cooling) system as mentioned above. The solid feed pump 10 may be a posimetric pump. The term "posimetric" may be defined as capable of metering (e.g., measuring an amount of) and positively displacing (e.g., trapping and forcing displacement of) a substance being delivered by the pump 10. The pump 10 is able to meter and positively displace a defined volume of a substance, such as a solid fuel feedstock. The pump path may have a circular shape or curved shape. Although the solid feed pump 10 is discussed with reference to the IGCC system 100 in FIG. 1, the disclosed embodiments of the solid feed pump 10 may be used in any suitable application (e.g., production of chemicals, fertilizers, substitute natural gas, transportation fuels, or hydrogen). In other words, the following discussion of the IGCC system 100 is not intended to limit the disclosed embodiments to IGCC.

The IGCC system 100 produces and burns a synthetic gas, i.e., syngas, to generate electricity. Elements of the IGCC system 100 may include a fuel source 102, such as a solid feed, that may be utilized as a source of energy for the IGCC. The fuel source 102 may include coal, petroleum coke, biomass, wood-based materials, agricultural wastes, tars, asphalt, or other carbon containing items. The solid fuel of the fuel source 102 may be passed to a feedstock preparation unit 104. The feedstock preparation unit 104 may, for example, resize or reshape the fuel source 102 by chopping, milling, shredding, pulverizing, briquetting, or pelletizing the fuel source 102 to generate a dry feedstock (e.g., particulate matter).

In the illustrated embodiment, the solid feed pump 10 delivers the feedstock from the feedstock preparation unit 104 to a gasifier 106. The solid feed pump 10 is configured to meter and pressurize the fuel source 102 received from the feedstock preparation unit 104. Inert fluids 12 may be routed directly to a portion of the solid feed pump 10 as indicated by arrow 14, a solid feed path upstream of the solid feed pump 10 as indicated by arrow 16, or a solid transport path downstream from the solid feed pump 10 as indicated by arrow 18, or a combination thereof. Inert fluids 12 may include an inert gas, water, oil, or another coolant medium. For example, the inert gas may include nitrogen. Depending on the thermal control path (e.g., coolant path), the fluids 12 also may include air or other plant process fluids. A controller 20 controls the distribution of the inert fluids 12 to the solid feed pump 10, the solid feed path upstream 16 of the pump 10, and/or the solid transport path downstream 18 of the pump 10. More specifically, the controller 20 controls the distribution of the inert fluids 12 via regulation of valves 22. In certain embodiments, the inert fluids 12 may initially flow through some portion of the solid feed pump 10 before being diverted to upstream or downstream of the pump 10 to serve other functions in solid feed processing (e.g., warming the bin or baghouse) or other components of the plant or system 100. The gasifier 106 converts the feedstock 102 into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius to 1600 degrees Celsius, depending on the type of gasifier 106 utilized.

The gasification process includes the feedstock undergoing a pyrolysis process, whereby the feedstock is heated. Temperatures inside the gasifier 106 may vary during the pyrolysis process, depending on the fuel source 102 utilized to generate the feedstock. The heating of the feedstock during the pyrolysis process generates a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A partial oxidation process also occurs in the gasifier 106. The oxidation process may include introducing oxygen to the char and residue gases. The char and residue gases react with the oxygen to form carbon dioxide and carbon monoxide, which provides heat for the gasification reactions. The temperatures during the partial oxidation process may range from approximately 700 degrees Celsius to 1600 degrees Celsius. Steam may be introduced into the gasifier 106 during gasification. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and release energy, which drives a second reaction that converts further feedstock to hydrogen and additional carbon dioxide.

In this way, a resultant gas is manufactured by the gasifier 106. This resultant gas may include approximately 85% of carbon monoxide and hydrogen in equal proportions, as well as $CH_4$, $HCl$, $HF$, $COS$, $NH_3$, $HCN$, and $H_2S$ (based on the sulfur content of the feedstock). This resultant gas may be termed untreated, raw, or sour syngas, since it contains, for example, $H_2S$. The gasifier 106 may also generate waste, such as slag 108, which may be a wet ash material. This slag 108 may be removed from the gasifier 106 and disposed of, for example, as road base or as another building material. Prior to cleaning the raw syngas, a syngas cooler 107 may be utilized to cool the hot syngas. The cooling of the syngas may generate high pressure steam which may be utilized to produce electrical power as described below. After cooling the raw syngas, a gas cleaning unit 110 may be utilized to clean the raw syngas. The gas cleaning unit 110 may scrub the raw syngas to remove the HCl, HF, COS, HCN, and $H_2S$ from the raw syngas, which may include separation of sulfur 111 in a sulfur processor 112 by, for example, an acid gas removal process in the sulfur processor 112. Furthermore, the gas cleaning unit 110 may separate salts 113 from the raw syngas via a water treatment unit 114 that may utilize water purification techniques to generate usable salts 113 from the raw syngas. Subsequently, the gas from the gas cleaning unit 110 may include treated, sweetened, and/or purified syngas, (e.g., the sulfur 111 has been removed from the syngas), with trace amounts of other chemicals, e.g., $NH_3$ (ammonia) and $CH_4$ (methane).

A gas processor 116 may be utilized to remove residual gas components 117 from the treated syngas such as, ammonia and methane, as well as methanol or any residual chemicals. However, removal of residual gas components 117 from the treated syngas is optional, since the treated syngas may be utilized as a fuel even when containing the residual gas components 117, e.g., tail gas. At this point, the treated syngas may include approximately 40% CO, approximately 40% $H_2$, and approximately 20% $CO_2$ and is substantially stripped of $H_2S$. This treated syngas may be transmitted to a combustor 120, e.g., a combustion chamber, of a gas turbine engine 118 as combustible fuel. Alternatively, the $CO_2$ may be removed from the treated syngas prior to transmission to the gas turbine engine.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The IGCC system 100 may also include the HRSG 138. High pressure steam may be transported into the HSRG 138 from the syngas cooler 107. Also, heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, along with the steam generated by the syngas cooler 107, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
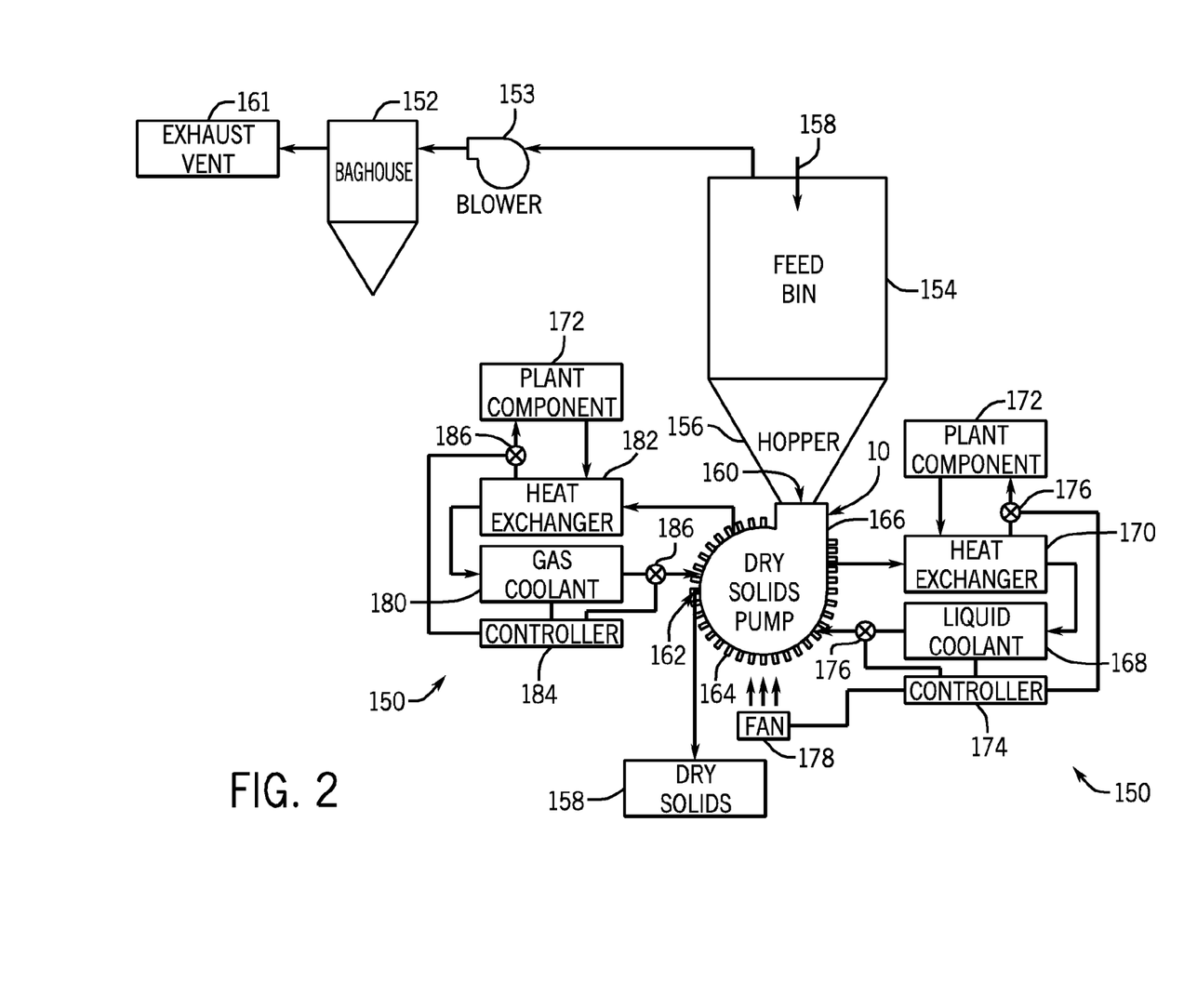
FIG. 2 is a schematic diagram of an embodiment of the solid feed pump, as shown in FIG. 1, with a thermal management system.
Figure 3:
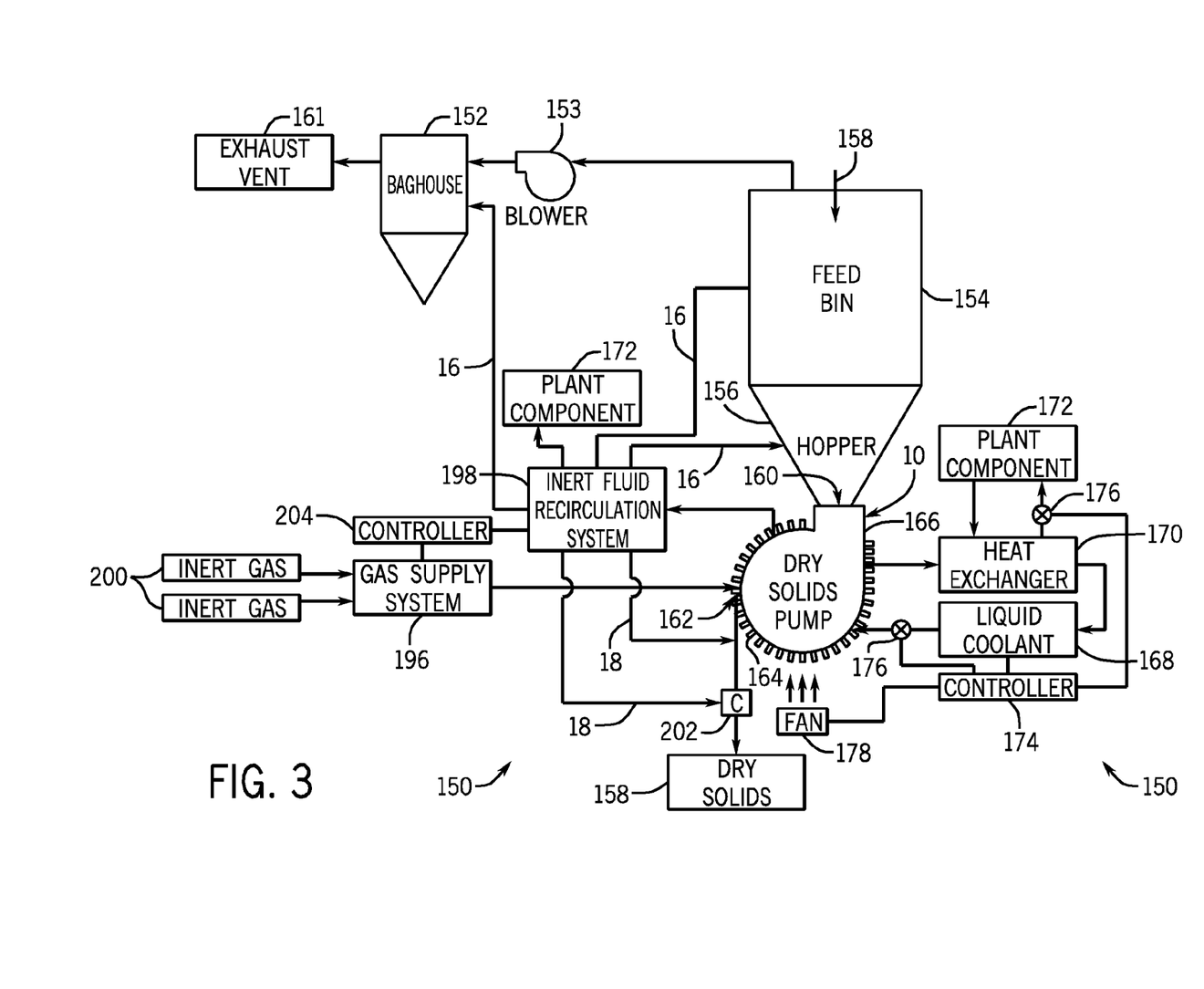
FIG. 3 is a schematic diagram of an embodiment of the solid feed pump, as shown in FIG. 1, with a thermal management system.

FIGS. 2 and 3 illustrate various thermal control systems (e.g., cooling systems) associated with the solid feed pump 10 and diversion of streams from the thermal management systems upstream and/or downstream of the pump 10. FIG. 2 is a schematic diagram of an embodiment of the solid feed pump 10, as shown in FIG. 1, with a thermal management system 150 (e.g., cooling system 150). The solid feed path includes a baghouse 152, a feed bin 154, and a hopper 156 located upstream of the solid feed pump or dry solids pump 10. A dry solids feedstock 158 is deposited in the feed bin 154, which routes the dry solids 158 to the hopper 156. The hopper 156 is coupled to an inlet 160 of the solid feed pump 10. The hopper 156 acts as a feedstock buffer to ensure an even, constant flow of feedstock or dry solids 158 into the solid feed pump 10. The hopper 156 and/or feed bin 154 may include, for example, vents that allow dust entrained in an atmospherically-ventable carrier gas, such as nitrogen, to exit the hopper 156 and/or feed bin 154 into a conduit via a blower 153. The blower 153 conveys the entrained dust from the hopper 156 and/or feed bin 154 into a cyclone separator and baghouse system 152. The cyclone separator and baghouse system 152 then separate the dust particulate from the gas, through the use of, for example, an aerodynamic vortex effect, gravity, and a set of filters (i.e., baghouses). The separated dust particulate may include fuel particulate, which may be reused as with the dry solids 158. Clean gas, free from the particulate, is discharged via an exhaust vent 161.

As described in greater detail below, the dry solids 158 upon entering the solid feed pump 10 via inlet 160 are conveyed from low to high pressure before being discharged from an outlet 162 of the pump 10. In certain embodiments, locations of the inlet 160 and outlet 162 of the pump 10 may vary. The conveyance and pressurization of the dry solids 158 results in the buildup of heat in the solid feed pump 10. FIG. 2 illustrates thermal management systems 150 to reduce the heat generated in portions of the solid feed pump 10. For example, the illustrated solid feed pump 10 includes multiple protrusions or fins 164 to allow for convective cooling of a housing 166 of the solid feed pump 10. The fins 164 provide structural integrity to the solid feed pump 10 as well as additional surface area to draw heat away from the pump 10. The fins 164 may be either horizontally or perpendicular to an axis of rotation of the pump 10.

Additionally, the solid feed pump 10 may be coupled to a liquid coolant 168. The liquid coolant 168 is routed through a coolant path through some portion or portions of the solid feed pump 10. Heat generated by the solid feed pump 10 is transferred to the liquid coolant 168. The liquid coolant 168 may include water or oil. As the heated liquid coolant 168 leaves the solid feed pump 10, the coolant 168 transfers heat to a heat exchanger 170. In some embodiments, the heat exchanger 170 may include a refrigeration cycle to provide cooling at the pump 10. The heat transferred to the heat exchanger 170 may be diverted to another plant component 172.

Heated liquid coolant 168 warmed from the solid feed pump 10 may be transferred to another portion of the solid feed pump 10. For example, the heated liquid coolant 168 may be used to regulate lube oil temperature by warming oil in a gearbox or hydraulic system of the solid feed pump 10. In certain embodiments, unheated liquid coolant 168 may be used to cool the oil.

A controller 174 may regulate the distribution of the liquid coolant 168 to the solid feed pump 10 as well as the transfer of heat from the heat exchanger 170 to plant components 172 via valves 176. These valves 176 may be distributed between the plant component 172 and the heat exchanger 170 as well as between the liquid coolant 168 and solid feed pump 10. The controller 174 may also regulate other aspects of the liquid coolant 168. For example, if multiple types of liquid coolant 168 are available, the controller 174 may select the type of liquid coolant 168 for the target coolant path and/or select the coolant path in the solid feed pump 10. Further, the controller 174 is coupled to and regulates a fan 178. The fan 178 forces an airflow across the fins 164 located on the housing 166 of the solid feed pump 10. Thus, forced convective cooling maybe used alone or in combination with the liquid coolant 168 and/or a gas coolant 180.

As illustrated, the solid feed pump 10 is coupled to the gas coolant 180. The gas coolant 180 may include inert gas, such as nitrogen, or a nitrogen/air mixture. The gas coolant 180 is routed through a coolant path through some portion or portions of the solid feed pump 10. Heat generated by the solid feed pump 10 is transferred to the gas coolant 180. As the heated gas coolant 180 leaves the solid feed pump 10, the coolant 180 transfers heat to a heat exchanger 182. The heat transferred to the heat exchanger 182 may be diverted to another plant component 172, as described above. The heated gas coolant 180 may be used similarly to the heated liquid coolant 168 described above.

A controller 184 may regulate the distribution of the gas coolant 180 to the solid feed pump 10 as well as the transfer of heat from the heat exchanger 182 to plant components 172 via valves 186. These valves 186 may be distributed between the plant component 172 and the heat exchanger 182 as well as between the gas coolant 180 and solid feed pump 10. The controller 174 may also regulate other aspects of the gas coolant 180. For example, the controller 174 may change the desired portion (e.g., the outlet 162) of the solid feed pump 10 for the gas coolant 180 to flow through.

In some embodiments, the thermal management system 150 may also divert streams from the system 150 to aspects of the solid feed processing upstream or downstream of the solid feed pump 10. For example, streams from the thermal management system 150 may be diverted for bin aeration, baghouse warming, bin warming, and other functions as described in detail below. FIG. 3 is a schematic diagram of an embodiment of the solid feed pump 10, as shown in FIG. 1, with the thermal management system 150 having inert fluid recirculation (e.g., gas recirculation). The illustrated embodiment includes solid feed pump 10, hopper 156, feed bin 154, baghouse 152, and thermal management system 150 with liquid coolant 168 and fan 178 as described in FIG. 2. Further, the thermal management system 150 includes a gas supply system 196 and inert fluid recirculation system 198 (e.g., gas recirculation system 198). The gas supply system 196 is coupled to one or more thermal control paths (e.g., coolant paths) located through portions of the solid feed pump 10. The gas supply system 196 receives inert gas 200 and supplies the gas 200 to one or more thermal control paths (e.g., inert fluid or inert gas coolant path) of the solid feed pump 10. The inert gas 200 may include nitrogen or air/nitrogen mixture. Although the illustrated embodiment includes gas supply system 196, in certain embodiments other supply systems (e.g., a fluid supply system) may supply fluids to the thermal control path. The inert fluid recirculation system 198 is also coupled to the inert fluid thermal control path or inert gas coolant path of the solid feed pump 10. The supplied inert gas 200 flows through the thermal control path and heat is transferred from one or more portions of the solid feed pump 10 to the gas 200. The heated gas 200 exits the solid feed pump 10 to the gas recirculation system 198. In certain embodiment, the inert fluid recirculation system 198 may be coupled to heat exchanger for heating and/or cooling the inert fluid.

The inert fluid recirculation system 198 is configured to couple with the solid feed path 16 upstream of the solid feed pump 10. For example, the inert fluid recirculation system 198 may be coupled to baghouse 152, solid feed bin 154, or solid feed hopper 156 in the solid feed path 16. The inert fluid recirculation system 198 is also configured to couple with the solid transport path 18 downstream of the solid feed pump 10. For example, the inert fluid recirculation system 198 is coupled to a buffer chamber 202 in the solid transport path 18. The inert fluid recirculation system 198 also may distribute the heated gas 200 to another plant component 172 (e.g., gasifier 106). In certain embodiments, the heated gas 200 may be redistributed to the one or more thermal control paths of the solid feed pump 10, e.g., to regulate lube oil temperature.

A controller 204 is coupled to both the gas supply system 196 and the inert fluid recirculation system 198 to regulate the distribution of the gas 200. The controller 204 may regulate the amount of gas 200 distributed and select the thermal control path for the gas as well as other functions related to the gas supply system 196. The controller 204 may also regulate the distribution of the heated gas 200 to various solid feed processing locations upstream or downstream of the solid feed pump 10. For example, heated gas 200 may be distributed upstream to aerate the feed bin 154 and hopper 156 to keep the flow of dry solids 158 falling through the bin 154 and hopper 156 towards the inlet 160 of the solid feed pump 10. Also, the heated gas 200 may be distributed upstream to warm the baghouse 152, feed bin 154, and/or hopper 156 to prevent dew point condensation within these locations. In addition, the heated gas 200 may be distributed to the feed bin 154 and/or hopper 156 to purge or provide an inert state in these locations, e.g., to keep the oxygen concentration below the ignition point. Purging may also help divert dust-containing gas towards the baghouse 152. Further, the heated gas 200 may be distributed downstream to buffer chamber 202 to prevent undesirable process gas leaks from downstream components (e.g., gasifier 106) from moving upstream to the solid feed pump 10. Thus, the heat from the streams used to cool the solid feed pump 10 may help in other functions of solid feed processing.

Figure 4:
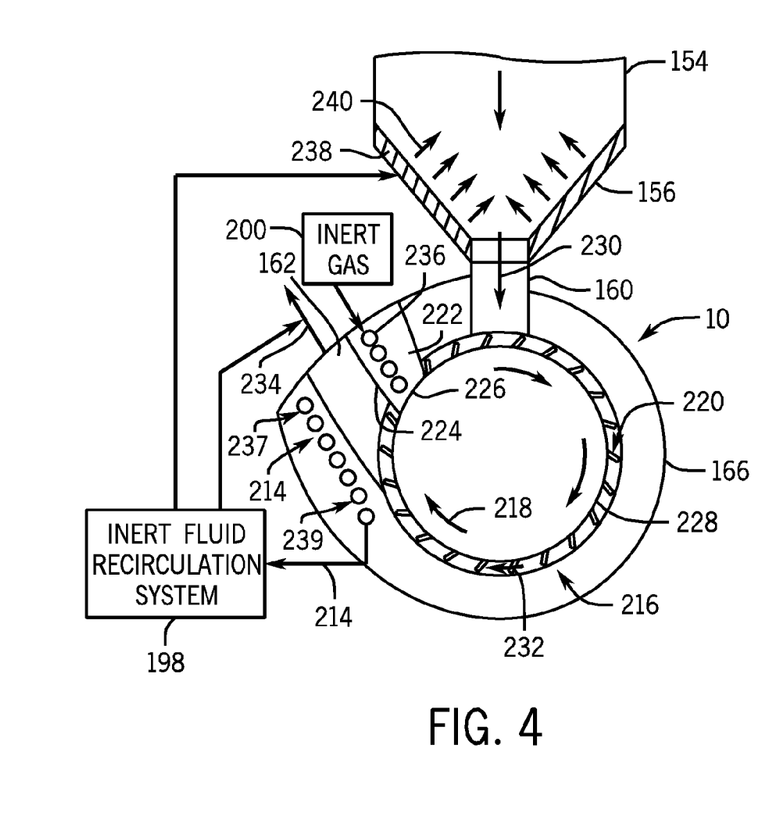
FIG. 4 is a cross-sectional side view of an embodiment of the solid feed pump with a single thermal control path.

FIGS. 4-22 illustrate various embodiments for thermal management (e.g., cooling) the solid feed pump 10. FIG. 4 is a cross-sectional side view of an embodiment of the solid feed pump 10 with a single thermal control path 214 (e.g., coolant path 214). As shown in FIG. 4, the solid feed pump 10 includes housing 166, inlet 160, outlet 162, rotor 216, and thermal control path 214. The rotor 216 may include two substantially opposed and parallel rotary discs, which include discrete cavities defined by protrusions to drive solids therebetween. The rotary discs are movable relative to the housing 166 in a rotational direction 218 from the inlet 160 towards the outlet 162. The inlet 160 and the outlet 162 are coupled to an internal feed passage or curved passage 220 (e.g., circular or annular passage). The curved passage 220 is disposed between the two rotary discs and within the housing 166. A solid feed guide 222 is disposed adjacent the outlet 162. The solid feed guide 222 extends across the curved passage 220 between the rotary discs. The solid feed guide 222 may include a guide wall 224 and a surface 226 that interfaces with the rotor 216. To ensure efficient performance of the solid feed pump 10, the rotor interfacing surface 226 of the solid feed guide 222 may be closely contoured to the shape of an outer surface 228 of the rotor 216.

As particulate matter is fed through the feed bin 154 and hopper 156 through an opening 230 of the inlet 160 at a region of lower pressure, the solid feed pump 10 imparts a tangential force or thrust to the particulate matter in the rotational direction 218 of the rotor 216. The direction of flow 232 of the particulate matter is from the inlet 160 to the outlet 162 at a region of higher pressure. As the particulate matter rotates through the curved passage 220, the particulate matter encounters the guide wall 224 of the solid feed guide 222 disposed adjacent the outlet 162 extending across the curved passage 220. In this region, the particulate matter locks-up, increases in pressure, and exits the pump 10 at a generally constant rate. The solid feed guide 222 routes the particulate matter through the outlet 162 and through a discharge opening 234 into an exit conduit connected to a high pressure vessel or into a conveyance pipe line.

Figure 5:
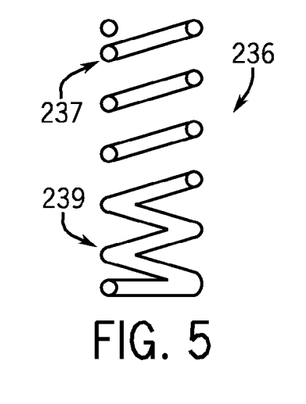
FIG. 5 is a cross-sectional side view of an embodiment of a cooling coil of the thermal control path.

The pressurization and increased speed in conveyance of the particulate matter generates heat throughout the solid feed pump 10, e.g. at or near the outlet 162 and/or solid feed guide 222. As illustrated, the solid feed pump 10 includes thermal control path 214 along the outlet 162. In certain embodiments, the thermal path 214 forms a single thermal coolant path 214 that may include a single coil 236 disposed about the outlet 162. FIG. 5 is a cross-sectional side view of an embodiment of a coil 236 (e.g., cooling coil 236) of the thermal control path 214 illustrating that a first portion 237 of the coil 236 may rotate 360 degrees around the outlet 162. As illustrated in FIG. 4, the coil 236 extends through the solid feed guide 222. In other embodiments, the coil 236 may extend about the outlet 162, but external and/or adjacent to the solid feed guide 222. This may be desirable to allow the removal and replacement of the solid feed guide 222 without removal of the coil 236. A second portion 239 of the coil 236 may extend beyond the outlet 162 into the housing 166 near the outlet 162 in a zig-zag (e.g., back and forth about 180 degrees or less of the outlet) or another tortuous flowpath, as shown in FIGS. 4 and 5. In some embodiments, the entire coil 236 may be disposed in the zig-zag pattern or tortuous flowpath about the outlet 162 and/or solid feed guide 222. Besides coils 236, in certain embodiments, the coolant path 214 may include an external passage disposed circumferentially about the outlet 162 for the circulation of coolant to divert heat from the outlet 162.

In order to cool the solid feed pump 10, inert gas 200, as described above, is circulated through the thermal control path 214 (e.g., inert gas coolant path 214 or inert fluid thermal control path 214). In other embodiments, cooling water or lube oil may be circulated through the thermal control path 214. Heat is transferred from components of the pump 10, such as the outlet 162, the solid feed guide 222, and/or the housing 166, to the inert gas 200. The heated inert gas 200 is distributed to the inert fluid recirculation system 198 coupled to the coolant path 214. As described above, the heated inert gas 200 may be distributed downstream or upstream of the solid feed pump 10 or simply vented to the atmosphere. For example, the heated inert gas 200 may be distributed to the hopper 156 and bin 154 for warming, inerting, and/or aerating, as described above. The hopper 156 may include a double wall 238. The double wall 238 may include porous pads or jets, as indicated by arrows 240, for passage of the warmed inert gas 200.

Figure 6:
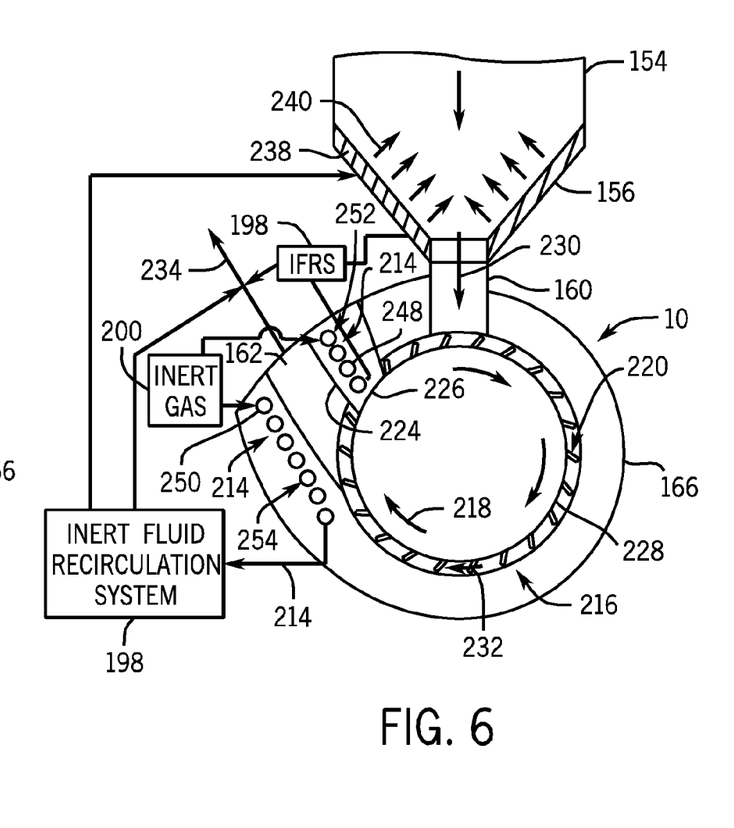
FIG. 6 is a cross-sectional side view of an embodiment of the solid feed pump with multiple thermal control paths.
Figure 7:
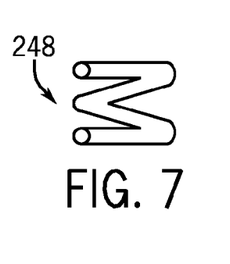
FIG. 7 is a cross-sectional side view of an embodiment of a first cooling coil from one of the multiple thermal control paths.
Figure 8:
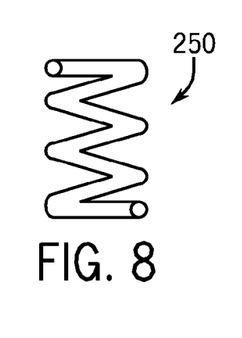
FIG. 8 is a cross-sectional side view of an embodiment of a second cooling coil from one of the multiple thermal control paths.

FIG. 6 is a cross-sectional side view of an embodiment of the solid feed pump 10 with multiple thermal control paths 214 (e.g., multiple coolant paths 214). The solid feed pump's structure and operation are as described in FIG. 4. As illustrated, the solid feed pump 10 includes thermal control path 214. The thermal control path 214 includes a first coil 248 (e.g., cooling coil 248) and a second coil 250 (e.g., cooling coil 250), which are disposed at least partially about the outlet 162. In addition, the first and second coils 248 and 250 are disposed on opposite sides of the outlet 162. As illustrated, the first coil 248 extends through the solid feed guide 222. In certain embodiments, the first coil 248 may extend about the outlet 162, but external and/or adjacent to the solid feed guide 222. FIG. 7 is a cross-sectional side view of an embodiment of the first coil 248, illustrating a zig-zag pattern with 180 degree turns or other tortuous flowpath. Similarly, FIG. 8 is a cross-sectional side view of an embodiment of the second coil 250, illustrating a zig-zag pattern with 180 degree turns or other torturous flowpath. Thus, the illustrated first and second coils 248 and 258 do not individually extend 360 degrees around the outlet 162, but collectively extend about 360 degrees about the outlet 162. In other words, each coil 248 and 250 curves partially about (e.g., 180 degrees) about the outlet 162, turns and curves back around (e.g., 180 degrees) the outlet 162 in the opposite direction, and so forth. As further shown in FIGS. 6 and 8, the second cooling coil 250 may extend beyond the outlet 162 into the housing 166 near the outlet 162.

The first and second coils 248 and 250 may be part of separate thermal control paths 214. For example, a first thermal control path 252 (e.g., coolant path 252) may include the first coil 248 and a second thermal control path 254 (e.g., coolant path 254) may include the second coil 250. Separate thermal control paths 214 (e.g., 252 and 254) allow independent control of each portion of the pump 10 to actively control thermal gradients. For example, the thermal gradients of the outlet 162 and the solid feed guide 222 may be kept within different temperature ranges. Inert gas 200 is supplied to each thermal control path 214 (e.g., inert gas coolant path 214), as described above, to cool the solid feed pump 10. In certain embodiments, the first and second thermal control paths 252 and 254 may be supplied with the same or different inert gas 200. In other embodiments, the first and second thermal control paths 252 and 254 may be supplied with cooling water or lube oil. As described in detail above, heat is transferred from the solid feed pump 10 to the thermal control paths 252 and 254. The heated inert gas 200 is distributed to the inert fluid recirculation system 198 coupled to both the first and second thermal control paths 252 and 254. As described above, the heated inert gas 200 may be distributed downstream or upstream of the solid feed pump 10. For example, the heated inert gas 200 may be distributed to the hopper 156 and bin 154 for warming, inerting, and/or aerating, as described above. Also, the heated inert gas 200 from the first and second thermal control paths 252 and 254 may be diverted to different locations either downstream or upstream of the solid feed pump 10. For example, the heated inert gas 200 from the first thermal control path 252 may be diverted upstream to the bin 154 for warming, while the heated inert gas 200 from the second thermal control path 252 may be diverted downstream to the buffer chamber 202 to act as a buffer.

Figure 9:
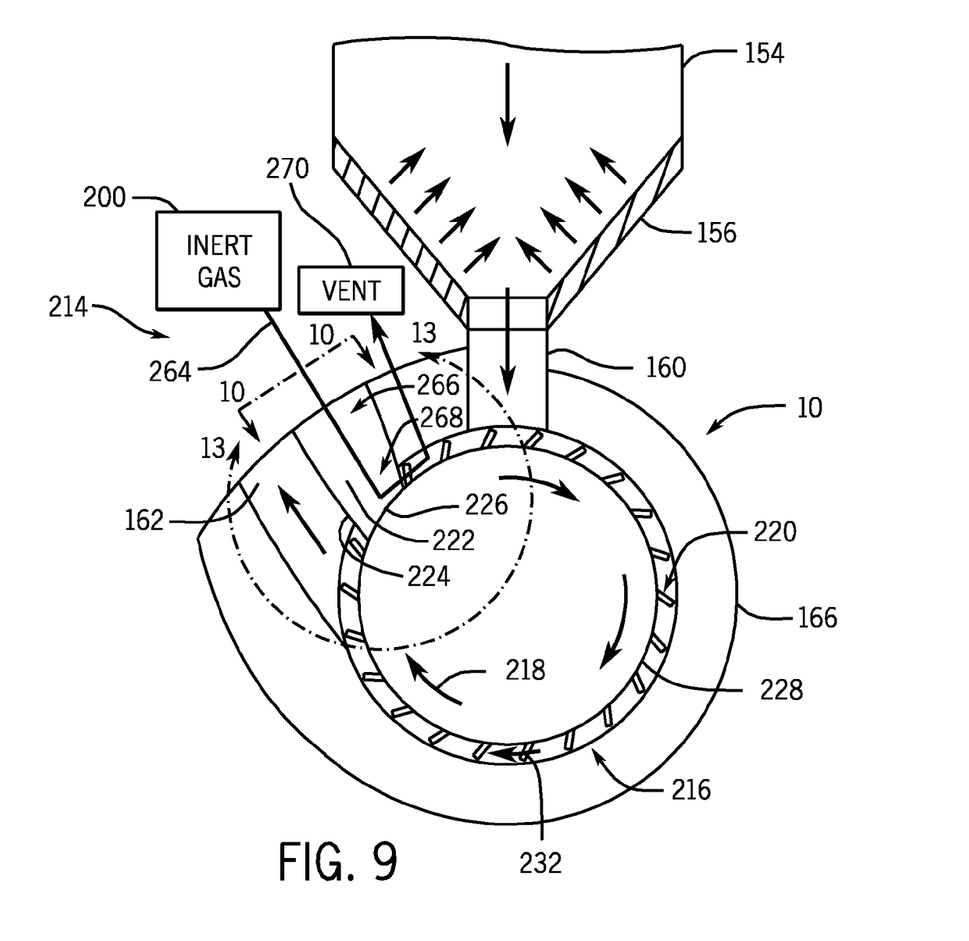
FIG. 9 is a cross-sectional side view of an embodiment of a guide coolant path associated with a solid feed guide.

As mentioned above, thermal control paths 214 may be associated with the solid feed guide 222 of the pump 10. For example, FIG. 9 is a cross-sectional side view of an embodiment of a guide path 264 (e.g., guide coolant path 264) associated with the solid feed guide 222. The solid feed pump's main structure and operation are as described in FIG. 4. The solid feed pump 10 includes thermal control path 214 (i.e., guide coolant path 264) in contact with the solid feed guide 222. As described in greater detail below, the guide coolant path 264 may be internal and/or external to the solid feed guide 222. Inert gas 200 is supplied to the guide coolant path 264. The guide coolant path 264 runs from a top portion 266 of the solid feed guide 222 to a bottom portion 268 of the solid feed guide 222, where the inert gas 200 exits near or at the outer surface 228 of the rotor 216. During operation of the solid feed pump 10, most heat generated at the solid feed guide 222 is along the guide wall 224 and the surface 226 that interfaces with the rotor 216. Heat is transferred to the inert gas 200 from both the solid feed guide 222 and the outer surface 228 of the rotor 216. The heated inert gas 200 then travels downstream of the solid feed guide 222 to a vent 270 located between the solid feed guide 222 and the inlet 160 of the solid feed pump 10. In addition, a seal may be present to inhibit flow of the gas 200 to the inlet 160. In some embodiments, the heated inert gas may be diverted upstream of the solid feed pump 10 to warm the baghouse 152 or other components.

Figure 10:
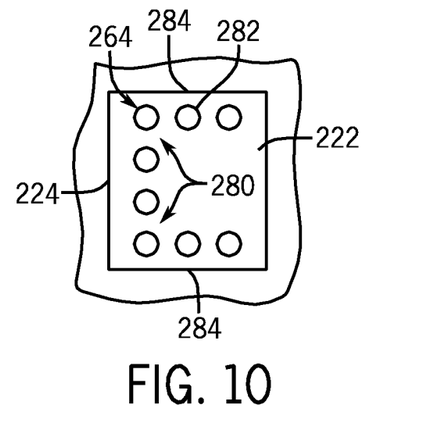
FIG. 10 is a top view of an embodiment of the guide coolant path extending internal to the solid feed guide, taken along line 10-10 of FIG. 9.

As mentioned above, the guide path 264 may be internal to the solid feed guide 222. FIG. 10 is a top view of an embodiment of the guide path 264 extending internal to the solid feed guide 222, taken along line 10-10 of FIG. 9. The solid feed guide 222 includes the guide path 264 that includes an internal path 280 (e.g., internal coolant path 280) that extends radially through the solid feed guide 222 and exits from the bottom portion 268 of the guide 222 near the outer surface 228 of the rotor 216. The internal coolant path 280 includes multiple passages 282 through the solid feed guide 222 for the passage of inert gas 200. The passages 282 include a generally elliptical shape, which may include a circle or an ellipse. In other embodiments, the passages 282 may include a curved shape, a rectilinear shape (e.g., a square), or any combination thereof. The number, size, and location of passages 282 may vary in various embodiments of the guide 222. For example, the number of passages may range from 2 to 10 or more. In the illustrated embodiment, the cross-sectional area of the passages 282 is uniform. In other embodiments, the cross-sectional area may vary from one passage 282 to another. As illustrated, the passages 282 are located near the guide wall 224 of solid feed guide 222 to allow cooling along the guide wall 224. In addition, passages 282 are located along side walls 284 of the solid feed guide 222. The internal coolant path 280 allows the transfer of heat from the solid feed guide 222 as well as heat from the outer surface of the rotor 216 to the inert gas 200. The heated gas 200 is then transferred to the vent 270 as described above.

Figure 11:
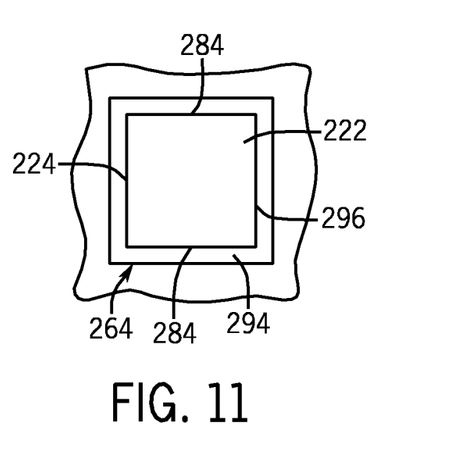
FIG. 11 is a top view of an embodiment of the guide coolant path extending external to the solid feed guide, taken along line 10-10 of FIG. 9.

Alternatively, the guide path 264 may be external to the solid feed guide 222. FIG. 11 is a top view of an embodiment of the guide path 264 extending external to the solid feed guide 222, taken along line 10-10 of FIG. 9. The solid feed guide 222 includes the guide path 264 that includes an external path 294 (e.g., external coolant path 294) that runs along the exterior of the solid feed guide 222 for the passage of inert gas 200. The gas 200 passing through the external coolant path 294 exits from the bottom portion 268 of the guide 222 near the outer surface 228 of the rotor 216. As illustrated, the external coolant path 294 encompasses the guide wall 224, side walls 284, and back wall 296. In certain embodiments, the external coolant path 294 may only encompass 1, 2, or 3 of these walls. The external coolant path 294 may only encompass a portion of each of the walls or the entire wall. The external coolant path 294 allows the transfer of heat from the solid feed guide 222 as well as heat from the outer surface of the rotor 216 to the inert gas 200. The heated gas 200 is then transferred to the vent 270 as described above.

Figure 12:
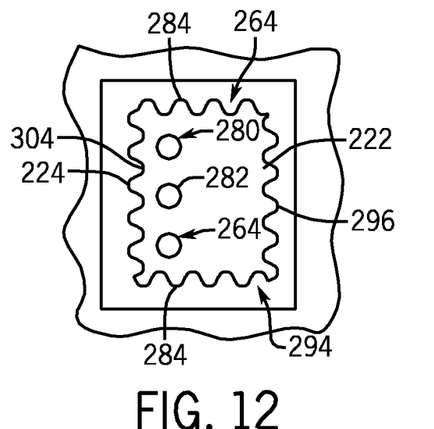
FIG. 12 is a top view of an embodiment of the guide coolant path extending internal and external to the solid feed guide, taken along line 10-10 of FIG. 9.

In some embodiments, the guide path 264 may be internal and external to the solid feed guide 222. FIG. 12 is a top view of an embodiment of the guide path 264 extending internal and external to the solid feed guide 222, taken along line 10-10 of FIG. 9. The solid feed guide 222 includes the guide coolant path 264. The guide coolant path 264 includes internal coolant path 280, as described in FIG. 10, and external coolant path 294, as described above in FIG. 11, to cool the guide wall 224, side walls 284, and back wall 296. In addition, the external coolant path 294 includes multiple coolant grooves and/or protrusions 304 along the exterior of the solid feed guide 222. As illustrated, the coolant grooves 304 are located on each wall of the solid feed guide 222. In certain embodiments, the coolant grooves 304 may be located on 1, 2, or 3 of these walls. The number and size of the coolant grooves 304 may vary on each wall as well as between walls of the solid feed guide 222. For example, the number of coolant grooves 304 may range between 2 to 10, 5 to 20, or more. The shape of the coolant grooves 304 may also vary. For example, the coolant grooves 304 may have a curved shape, a rectilinear shape, or a combination thereof. The coolant grooves 304 increase the external surface area of the solid feed guide 222 that may be cooled by inert gas 200 that passes through the external coolant path 294. The internal and external coolant paths 280 and 294 allow the transfer of heat from the solid feed guide 222 as well as heat from the outer surface of the rotor 216 to the inert gas 200. The heated gas 200 is then transferred to the vent 270 as described above.

Figure 13:
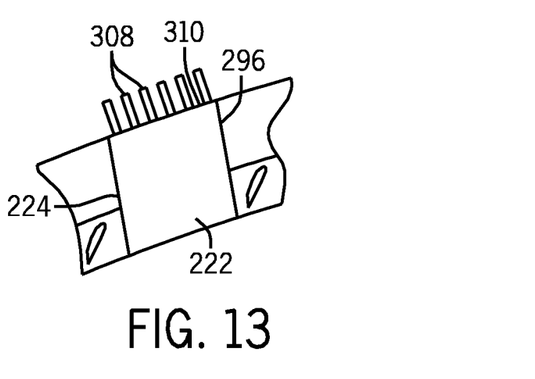
FIG. 13 is a partial cross-sectional side view of an embodiment of the solid feed guide, taken within line 13-13 of FIG. 9.

Embodiments may include additional features to cool the solid feed guide 222. FIG. 13 is a partial cross-sectional side view of an embodiment of the solid feed guide 222, taken within line 13-13 of FIG. 9. As illustrated, the solid feed guide 222 includes multiple protrusions or fins 308 located on a top surface 310 of the guide 222 to enable convective cooling. The fins 308 provide additional rigidity to the solid feed guide 222 as well as additional surface area to convect heat away from the guide 222. In certain embodiments, the fins 308 may be located on the back wall 296 of the solid feed guide 222. If the fins 308 are located on the back wall 296, a small gap may be present between the housing 166 and the back wall 296 of the solid feed guide 222 to allow heat to escape. An inert gas or ambient air 200 may be injected into this gap to pass over the fins 308 and cool the solid feed guide 222. The number and shape of the fins 308 may vary. For example, the number of fins 308 on a single surface of the solid feed guide 222 may range between 1 to 10 or more. The convective cooling of the solid feed guide 222 may be passive (e.g., no fan) or active/forced (e.g., fan).

Figure 14:
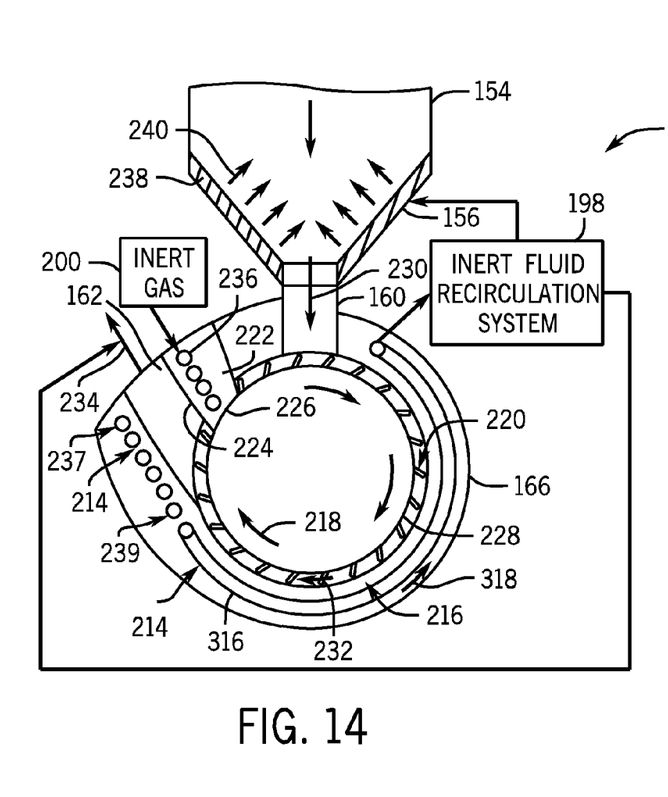
FIG. 14 is a cross-sectional side view of an embodiment of the solid feed pump with a housing coolant path.

Embodiments may include features to cool the housing 166 of the solid feed pump 10. FIG. 14 is a cross-sectional side view of an embodiment of the solid feed pump 10 with a housing path 316 (e.g., housing coolant path 316). The solid feed pump 10 is as structurally described above. The solid feed pump 10 includes thermal control path 214 disposed along the outlet 162 as described above. In addition, thermal control path 214 includes housing coolant path 316. Housing coolant path 316 extends through the housing 166 circumferentially about the rotor 216 in direction 318. Inert gas 200 is circulated through the thermal control path 214 along the outlet 162 and around the housing 166 via path 316. For example, the illustrated inert gas 200 flows first through the coil 236 about the outlet 162, and then flows partially around the housing 166 through path 316 to the inert fluid recirculation system 198. As mentioned above, in other embodiments, cooling water or lube oil may be circulated through the thermal control path 214. As inert gas 200 circulates through the housing coolant path 316 from adjacent the outlet 162 to near the inlet 160, heat is transferred from the housing 166 to the gas 200. The heated gas 200 is then transferred to the inert fluid recirculation system 198 coupled to the thermal control path 214. As described above, the heated inert gas 200 may be distributed downstream or upstream of the solid feed pump 10. For example, the heated gas 200 may be distributed to the hopper 156 and bin 154 for warming, inerting, and/or aerating, as described above.

Figure 15:
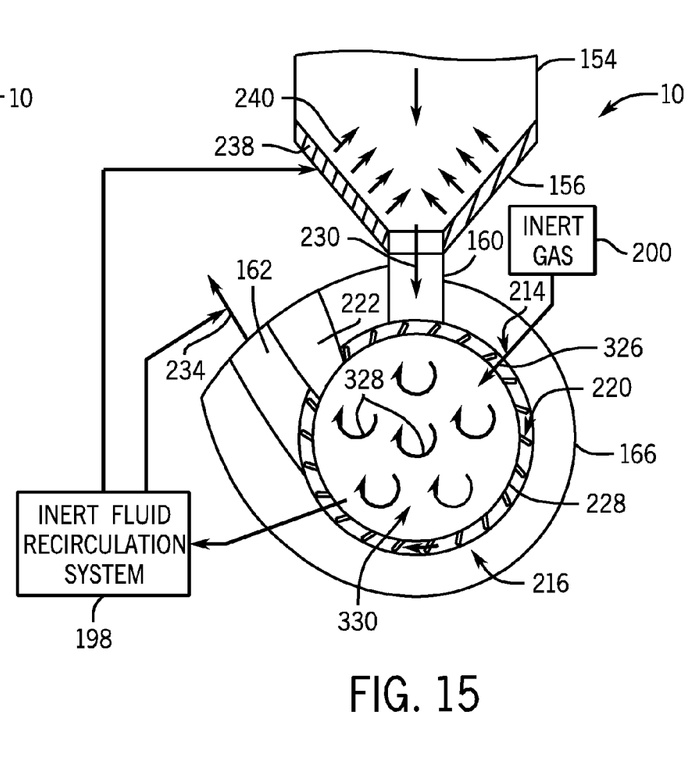
FIG. 15 is a cross-sectional side view of an embodiment of the solid feed pump with a rotor coolant path.

Other embodiments may include features to cool the rotor 216 of the solid feed pump 10. For example, FIG. 15 is a cross-sectional side view of an embodiment of the solid feed pump 10 with a rotor path 326 (e.g., rotor coolant path 326). The solid feed pump 10 is as structurally described above. The solid feed pump 10 includes the thermal control path 214, which extends through the rotor 216 via the rotor coolant path 326. Inert gas 200 may be introduced into the rotor coolant path 326, e.g., by injecting gas 200 around notches in the housing 160, so that the gas 200 enters a hollow interior 330 of the rotor 216. In the interior 330, the gas 200 circulates along the inner wall of the rotor 216, as indicated by arrows 328, and heat is transferred to the gas 200. The inert gas 200 both purges and cools the housing 166 and cavities of the rotor 216, while a generally uniform temperature throughout the housing 166, rotor 216, and bearings. The heated gas 200 is then transferred to the inert fluid recirculation system 198 coupled to the thermal control path 214. As described above, the heated inert gas 200 may be distributed downstream or upstream of the solid feed pump 10.

Figure 16:
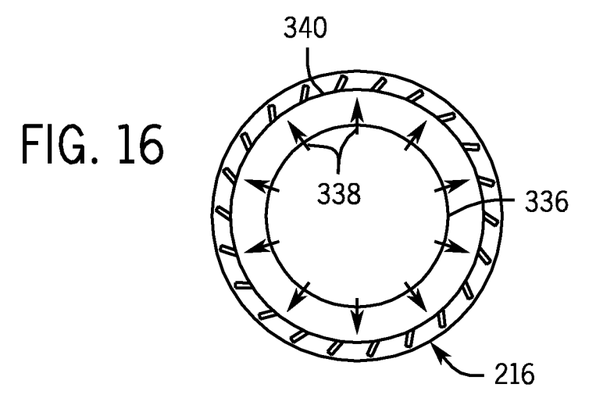
FIG. 16 is a cross-sectional side view of an embodiment of the rotor designed for impingement cooling.
Figure 17:
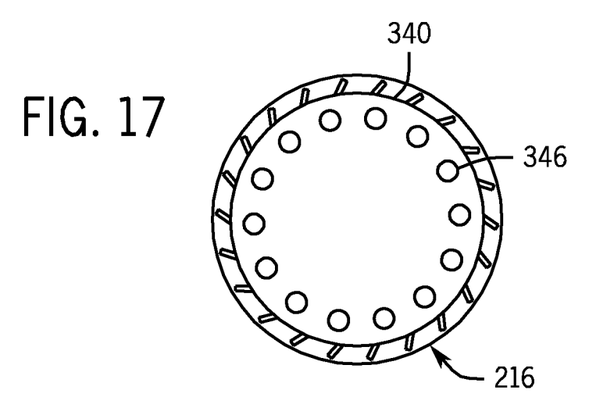
FIG. 17 is a cross-sectional side view of an embodiment of the rotor with cooling coils.
Figure 18:
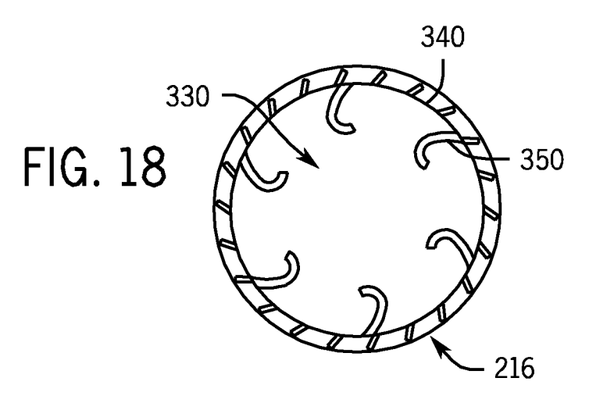
FIG. 18 is a cross-sectional side view of an embodiment of the rotor with mixing fins.

The rotor 216 may include various features and arrangements, as described below in FIGS. 16-18, to improve the cooling of the rotor 216 by the rotor coolant path 326. For example, FIG. 16 is a cross-sectional side view of an embodiment of the rotor 216 designed for impingement cooling. The rotor 216 includes a circular arrangement of impingement jets 336 which direct the inert gas 200 towards an inner surface 340 of the rotor 216 as indicated by arrows 338. The passage of the inert gas 200 through the jets 336 enables impingement cooling of the inner surface 340 of the rotor 216. By further example, FIG. 17 is a cross-sectional side view of an embodiment of the rotor 216 with coils 346 (e.g., cooling coils 346). The rotor 216 includes multiple stationary coils 346 distributed along the inner surface 340 of the rotor 216. Inert gas 200, or another inert fluid, may be circulated through the coils 346 to cool the rotor 216. By further example, FIG. 18 is a cross-sectional side view of an embodiment of the rotor 216 with mixing fins 350. The rotor 216 includes multiple mixing fins 350 coupled to the inner surface 340 of the rotor 216. The mixing fins 350 induce swirl and/or circulate flow of the inert gas 200 within the hollow interior 330 of the rotor 216. In certain embodiments, the rotor 216 may include any combination of jets 336, coils 346, and fins 350.

Figure 19:
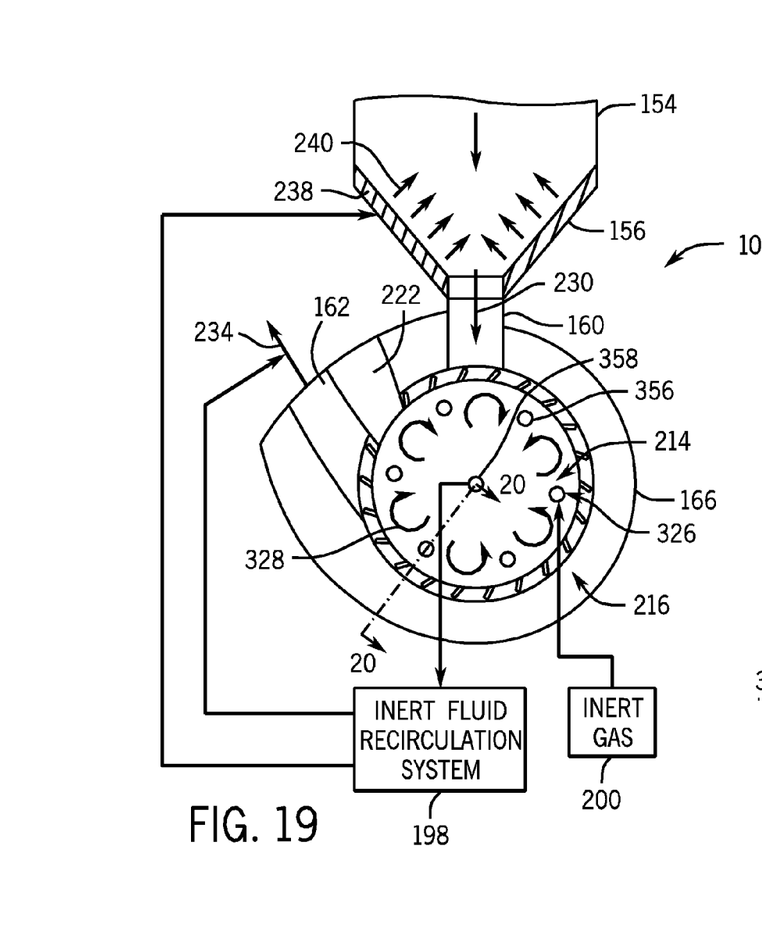
FIG. 19 is a cross-sectional side view of an embodiment of the solid feed pump with an internal rotor coolant path.

FIG. 19 is a cross-sectional side view of an embodiment of the solid feed pump 10 with an internal rotor path 326 (e.g., internal rotor coolant path 326). The solid feed pump 10 is as structurally described above. The solid feed pump 10 includes the thermal control path 214, which extends through the rotor 216 via the rotor coolant path 326. Inert gas 200 may be introduced into the rotor coolant path 326, e.g., by injecting gas into openings 356 dispersed circumferentially around the rotor 216, so that the gas 200 enters the hollow interior 330 of the rotor 216. In the interior 330, the gas 200 circulates along the inner wall of the rotor 216, as indicated by arrows 328, and heat is transferred to the gas 200. The inert gas 200 both purges and cools the housing 166 and cavities of the rotor 216, while providing a generally uniform temperature throughout the housing 166, rotor 216, and bearings. The heated gas 200 exits via a central opening 358 of the rotor 216, and is then transferred to the inert fluid recirculation system 198. As described above, the heated inert gas 200 may be distributed downstream or upstream of the solid feed pump 10.

Figure 20:
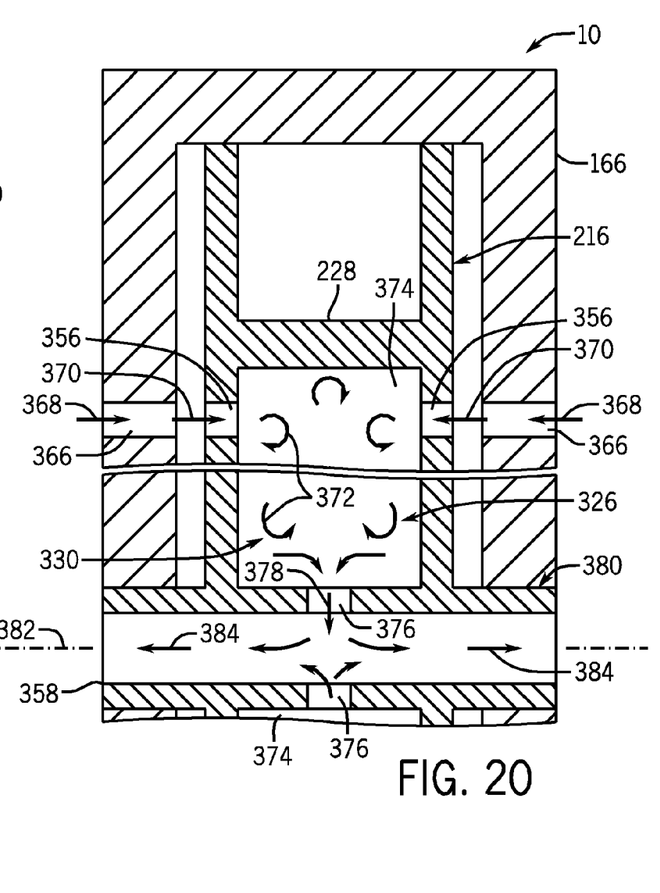
FIG. 20 is a partial cross-sectional view of an embodiment of the solid feed pump, taken along line 20-20 of FIG. 19.

FIG. 20 provides greater detail as to the route of the rotor coolant path 326. FIG. 20 is a partial cross-sectional view of an embodiment of the solid feed pump 10, taken along line 20-20 of FIG. 19. Inert gas 200 is injected through openings 366 of the housing 166 of the solid feed pump 10, as indicated by arrows 368. The inert gas 200 then enters openings 356 of the rotor 216, as indicated by arrows 370, into the hollow interior 330 of the rotor 216. The openings 356 are located adjacent, but below the outer surface 228 of the rotor 216 where the dry solids 158 pass. The inert gas 200 circulates within the interior 330 of the rotor 216, as indicated by arrows 372, to purge and cool the housing 166 and cavities 374 of the rotor 216, while providing a generally uniform temperature throughout the housing 166, rotor 216, and bearings. The heated gas 200 exits the cavities 374 via openings 376, as indicated by arrows 378, into a shaft 380 that runs through the rotor 216 along a centerline 382 about which the rotor 216 rotates. The heated gas 200 flows along the shaft 380, as indicated by arrows 384, where the gas 200 may be routed to the inert recirculation system 198 and subsequently distributed downstream or upstream of the solid feed pump 10, as described above.

Figure 21:
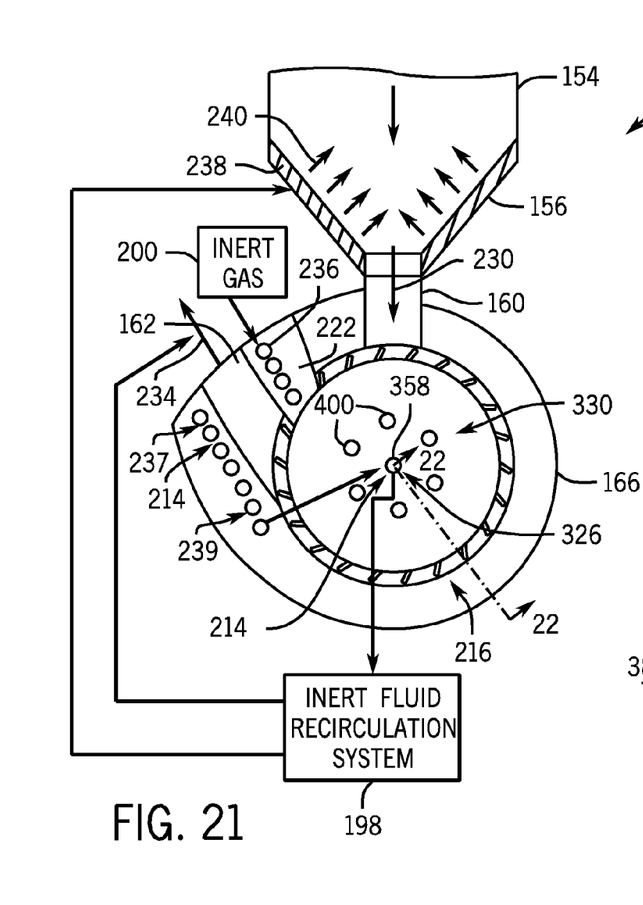
FIG. 21 is a cross-sectional side view of an embodiment of the solid feed pump with the thermal control path along the outlet and extending to the rotor coolant path.

Alternatively, the rotor coolant path 326 may form a portion of a closed-circuit thermal control path 214 (closed-circuit coolant path 214). FIG. 21 is a cross-sectional side view of an embodiment of the solid feed pump 10 with the thermal control path 214 along the outlet 162 and extending to the rotor coolant path 326. The solid feed pump 10 is as structurally described above. The solid feed pump 10 includes thermal control path 214, which extends through the rotor 216 via the rotor coolant path 326. Inert gas 200 may be circulated through the thermal control path 214 beginning at, e.g., coil 236. Inert gas 200 is transferred into the rotor coolant path 326 via central opening 358 of the rotor 216, so that the gas 200 enters the hollow interior 330 of the rotor 216. In the interior 330, the gas 200 circulates and heat is transferred to the gas 200. The inert gas 200 both purges and cools the housing 166 and cavities of the rotor 216, while providing a generally uniform temperature throughout the housing 166, rotor 216, and bearings. The heated gas 200 exits via the off-center openings 400, and is then transferred to the inert fluid recirculation system 198. As described above, the heated inert gas 200 may be distributed downstream or upstream of the solid feed pump 10. Thus, the inert fluid path 214 forms the closed-circuit thermal control path 214 along outlet 162, along a portion of housing 166, and through rotor 216 to cool the solid feed pump 10.

Figure 22:
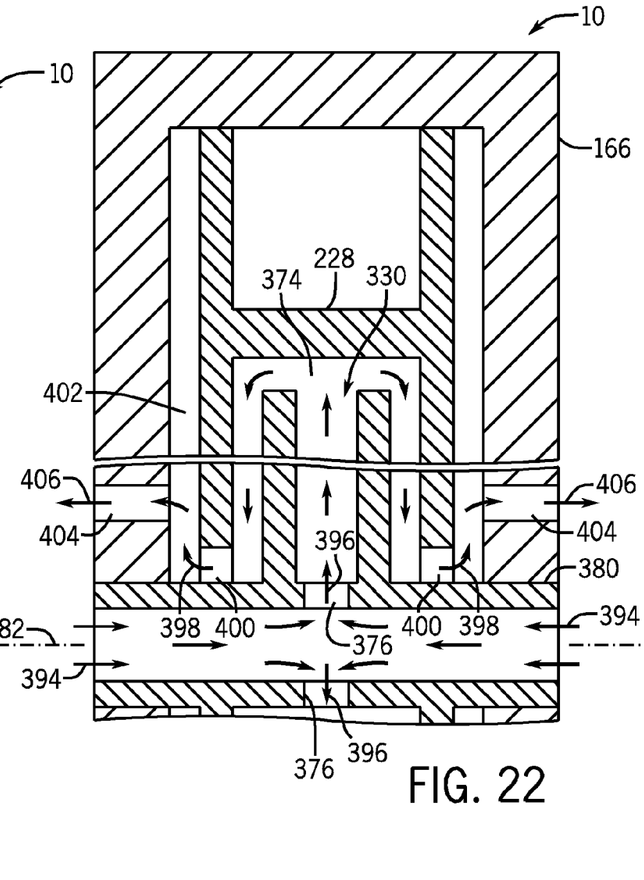
FIG. 22 is a partial cross-sectional side view of an embodiment of the solid feed pump taken along line 22-22 of FIG. 21.

FIG. 22 provides greater detail as to the route of the rotor coolant path 326 portion of the closed-circuit thermal control path 214. FIG. 22 is a partial cross-sectional side view of an embodiment of the solid feed pump 10 taken along line 22-22 of FIG. 21. Inert gas 200 is injected into shaft 380 along the centerline 382, as indicated by arrows 394. The inert gas 200 flows, as indicated by arrows 396, into the hollow interior 330 of the cavities 374 of the rotor 216 via openings 376. The gas 200 exits the rotor 216, as indicated by arrows 398, via openings 400 into a gap 402 between the rotor 216 and housing 166. The openings 400 are located at an offset from the shaft 380. The gas 200 then exits the solid feed pump 10 via openings 404 in the housing 166, as indicated by arrows 406, to the inert fluid recirculation system 198. The heated gas 200 may be subsequently distributed downstream or upstream of the solid feed pump 10, as described above. In the illustrated embodiment, the openings 400 and 404 are radially and axially offset from one another to define a non-straight path through the gap 402. In other embodiments, the openings 400 and 404 may be radially aligned with one another, or the openings 400 and 404 may be spaced radially and circumferentially apart from one another. The inert gas 200 circulates through the interior 330 of the rotor 216 to purge and cool the housing 166 and cavities 374 of the rotor 216, while providing a generally uniform temperature throughout the housing 166, rotor 216, and bearings. The embodiments described above in FIGS. 1-22 are not mutually exclusive and may be combined with one another in any suitable combination.

Technical effects of the invention include providing a thermal management system 150 for the solid feed pump 10 to control temperature within the pump 10 during the conveyance of solids from low to high pressure. The thermal management system 150 may provide various coolant paths 214 for the outlet 162, the solid feed guide 222, the housing 166, and/or the rotor 216. The thermal management system 150 may prolong the life of the components of the solid feed pump 10, thereby reducing downtime of the overall system that utilizes the dry solids 158. In addition, the thermal management system 150 allows cheaper metals to be used in the solid feed pump 10 due to the reduction in heat. Also, the thermal management system may provide active clearance control for critical components of the pump 10. Further, heated coolant diverted from the solid feed pump 10 may be integrated into system operations downstream or upstream of the solid feed pump 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a solid feed pump, comprising:
  a housing;
  a rotor disposed in the housing;
  a curved passage disposed between the rotor and the housing, wherein the curved passage is configured for transport of a solid feed through the curved passage;
  a solid feed inlet coupled to the curved passage;
  a solid feed outlet coupled to the curved passage;
  a solid feed guide extending into and across the curved passage and/or against the rotor, wherein the solid feed guide is disposed adjacent the solid feed outlet, and the solid feed guide comprises a guide wall that substantially blocks the curved passage adjacent the solid feed outlet; and
  a thermal control path through a portion of the solid feed pump, wherein the thermal control path extends through, along, or around at least one of the solid feed guide, the solid feed outlet, or the rotor.

2. The system of claim 1, wherein the thermal control path comprises a guide path in contact with the solid feed guide.

3. The system of claim 2, wherein the guide path comprises an internal path through the solid feed guide.

4. The system of claim 2, wherein the guide path comprises an external path along an exterior of the solid feed guide.

5. The system of claim 4, wherein the external path comprises a plurality of coolant grooves along the exterior of the solid feed guide.

6. The system of claim 1, wherein the thermal control path extends around the solid feed outlet.

7. The system of claim 6, wherein the thermal control path comprises a first coil disposed at least partially around the solid feed outlet.

8. The system of claim 7, wherein the thermal control path comprises a second coil disposed at least partially around the solid feed outlet, and the first and second coils are disposed on opposite sides of the solid feed outlet.

9. The system of claim 1, wherein the thermal control path comprises a rotor path inside the rotor.

10. The system of claim 9, wherein the rotor comprises a hollow interior having a plurality of mixing fins, a plurality of coils, or a combination thereof.

11. The system of claim 1, wherein the thermal control path comprises a housing path extending through the housing circumferentially about the rotor.

12. The system of claim 1, wherein the thermal control path is coupled to a plant component.

13. The system of claim 1, wherein the thermal control path is coupled to a gas supply system and a gas recirculation system.

14. The system of claim 13, wherein the gas recirculation system is coupled to a solid feed path upstream from the solid feed pump, a solid transport path downstream from the solid feed pump, or a combination thereof.

15. A system, comprising:
a solid feed pump, comprising:
an internal feed passage;
an solid feed inlet coupled to the internal feed passage;
an solid feed outlet coupled to the internal feed passage;
an inert fluid path through the solid feed pump; and
a gas recirculation system coupled to the inert fluid path, wherein the gas recirculation system is configured to couple with a solid feed path upstream from the solid feed pump, a solid transport path downstream from the solid feed pump, or a combination thereof, wherein the gas recirculation system is coupled to a solid feed bin or a solid feed hopper in the solid feed path, a buffer chamber in the solid transport path, or a combination thereof.

16. The system of claim 15, wherein the gas recirculation system is coupled to the solid feed bin or the solid feed hopper in the solid feed path.

17. The system of claim 15, wherein the gas recirculation sysem is coupled to the buffer chamber in the solid transport path.

18. The system of claim 15, wherein the gas recirculation sysem is coupled to the solid feed bin or the solid feed hopper in the solid feed path and coupled to the buffer chamber in the solid transport path.

19. A system, comprising:
a solid feed pump, comprising:
a housing;
a rotor disposed in the housing;
a curved passage disposed between the rotor and the housing, wherein the curved passage is configured for transport of a solid feed through the curved passage;
a solid feed inlet coupled to the curved passage;
a solid feed outlet coupled to the curved passage;
a solid feed guide extending into and across the curved passage and/or against the rotor, wherein the solid feed guide is disposed adjacent the solid feed outlet, and the solid feed guide comprises a plurality of coolant groves along the exterior of the solid feed guide; and
a thermal control path through a portion of the solid feed pump, wherein the thermal control path extends through, along, or around at least one of the solid feed guide, the solid feed outlet, or the rotor.

20. A system, comprising:
a solid feed pump, comprising:
a housing;
a rotor disposed in the housing;
a curved passage disposed between the rotor and the housing, wherein the curved passage is configured for transport of a solid feed through the curved passage;
a solid feed inlet coupled to the curved passage;
a solid feed outlet coupled to the curved passage;
a solid feed guide extending into and across the curved passage and/or against the rotor, wherein the solid feed guide is disposed adjacent the solid feed outlet; and
a thermal control path through a portion of the solid feed pump, wherein the thermal control path extends at least around the solid feed outlet.

* * * * *